United States Patent
Park et al.

(10) Patent No.: US 9,234,806 B2
(45) Date of Patent: Jan. 12, 2016

(54) CRITICAL TEMPERATURE INDICATOR AND MANUFACTURING METHOD THEREOF

(75) Inventors: Ji Hoon Park, Suwon-si (KR); Dongsul Kim, Goyang-si (KR); Hwajung Lee, Seoul (KR); Jaehwang Lee, Cheongju-si (KR); Gilnam Hong, Seoul (KR); Kwanyong Jung, Yangju-si (KR); Youngseok Park, Cheonan-si (KR); Jiyong Park, Goyang-si (KR); Seungil Shin, Seoul (KR); Jungeun Ahn, Seoul (KR)

(73) Assignee: INTELLECTUAL DISCOVERY INC., Seoul (KR)

( * ) Notice: Subject to any disclaimer, the term of this patent is extended or adjusted under 35 U.S.C. 154(b) by 353 days.

(21) Appl. No.: 13/981,689

(22) PCT Filed: Jan. 20, 2012

(86) PCT No.: PCT/KR2012/000546
§ 371 (c)(1),
(2), (4) Date: Jul. 25, 2013

(87) PCT Pub. No.: WO2012/102532
PCT Pub. Date: Aug. 2, 2012

(65) Prior Publication Data
US 2013/0305980 A1 Nov. 21, 2013

(30) Foreign Application Priority Data
Jan. 26, 2011 (KR) .................. 10-2011-0007618

(51) Int. Cl.
*G01K 11/12* (2006.01)
*G01K 3/04* (2006.01)
*G01K 11/06* (2006.01)

(52) U.S. Cl.
CPC *G01K 11/12* (2013.01); *G01K 3/04* (2013.01); *G01K 11/06* (2013.01); *G01K 2207/04* (2013.01)

(58) Field of Classification Search
CPC ..... G01K 11/12; G01K 3/04; G01K 2207/04; G01K 11/06
USPC .......... 116/206–207, 216–220; 374/102, 104, 374/159, 162; 493/320, 379
See application file for complete search history.

(56) References Cited

U.S. PATENT DOCUMENTS 3,958,528 A * 5/1976 Hill .................. G01K 11/06
116/219

(Continued)

FOREIGN PATENT DOCUMENTS

| JP | 64-012237 A | 1/1989 |
| JP | 2002-365145 A | 12/2002 |

(Continued)

OTHER PUBLICATIONS

International Search Report issued Aug. 14, 2012 in counterpart International Application No. PCT/KR2012/000546 (5 pages, in Korean, with complete English translation).

*Primary Examiner* — R. A. Smith
*Assistant Examiner* — Tania Courson
(74) *Attorney, Agent, or Firm* — Rothwell, Figg, Ernst & Manbeck, P.C.

(57) ABSTRACT

An upper section is formed of a base film. A developing media member is formed of a micro-porous film to be positioned correspondingly to the upper section such that the developing media member is joined with the upper section. A time control section is formed by engraving a movement path of developing media on the developing media member by means of a printer, cutter or the like. At least one or more cutaway sections and a plurality of transparent members are positioned on the time control section, wherein the cutaway sections are positioned at both side surfaces of the time control section corresponding to the movement path so as to temporarily store the developing media, and the transparent members have linear-shaped first display windows so as to display the arrival of the developing media, which indicates the end of the movement of the developing media.

5 Claims, 8 Drawing Sheets

(56) References Cited

U.S. PATENT DOCUMENTS

| | | | | |
|---|---|---|---|---|
| 4,457,252 | A * | 7/1984 | Manske | G01K 11/06 |
| | | | | 116/216 |
| 4,846,095 | A * | 7/1989 | Emslander | G01K 11/06 |
| | | | | 116/206 |
| 5,120,137 | A * | 6/1992 | Ou-Yang | G01K 3/04 |
| | | | | 116/219 |
| 6,957,623 | B2 * | 10/2005 | Guisinger | G01K 11/06 |
| | | | | 116/206 |
| 7,232,253 | B2 | 6/2007 | Isbitsky et al. | |
| 8,701,587 | B2 * | 4/2014 | Park | G01K 3/04 |
| | | | | 116/219 |
| 8,800,472 | B2 * | 8/2014 | Park | G01K 3/04 |
| | | | | 116/219 |
| 2014/0311401 | A1 * | 10/2014 | Park | G01K 3/04 |
| | | | | 116/216 |

FOREIGN PATENT DOCUMENTS

| | | |
|---|---|---|
| KR | 2003-0082364 A | 10/2003 |
| KR | 10-2005-0074008 A | 7/2005 |
| KR | 10-2010-0045692 A | 5/2010 |
| KR | 10-2011-0008419 A | 1/2011 |
| WO | WO 2012/102532 A2 | 8/2012 |

* cited by examiner

CRITICAL TEMPERATURE INDICATOR AND MANUFACTURING METHOD THEREOF

TECHNICAL FIELD

The present invention relates to a critical temperature indicator configured to observe and display a critical temperature of frozen or chilled foods, and more particularly, to a critical temperature indicator capable of indicating a red warning mark in the case of an improper storage state according to a time lapse in a storage temperature profile from an initial manufacture instant to a final use of frozen or chilled foods and enabling mass production, and a method of manufacturing the same.

BACKGROUND ART

According to recent enhancement of a cold storage industry, frozen and chilled foods should be observed, and in particular, foods such as milk products, fishes and fruits in dietary life should be always maintained in a fresh state throughout the entire distribution process from producers to consumers. However, consumer in a last consumer distribution phase cannot discriminate whether foods are appropriately stored throughout the entire distribution process but can merely determine whether the foods are in a chilled state during a purchase step.

In addition, a manager who professionally manages distribution of foods could not easily recognize frequently whether the corresponding foods are distributed in a safe cold storage stage. While a plurality of methods and apparatuses for recognizing the frozen and chilled state are disclosed, such conventional methods and apparatuses cannot determine whether the safe cold storage state is maintained throughout the entire distribution process.

Reviewing the conventional art, there is a food container having a display section showing a proper storage state corresponding to a frozen or chilled state. The food container uses a film type thermometer attached to an upper surface of a cover of the food container, in which foods are contained and chilled in a refrigerator, and configured to change its color according to a variation in temperature, enabling discrimination of a proper cold storage state of contents through a mark.

In addition, as a similar technique, a temperature display device including a "label" structure having a temperature display function and configured to visually and noticeably display various colors according to a temperature change is disclosed.

Figure 1:
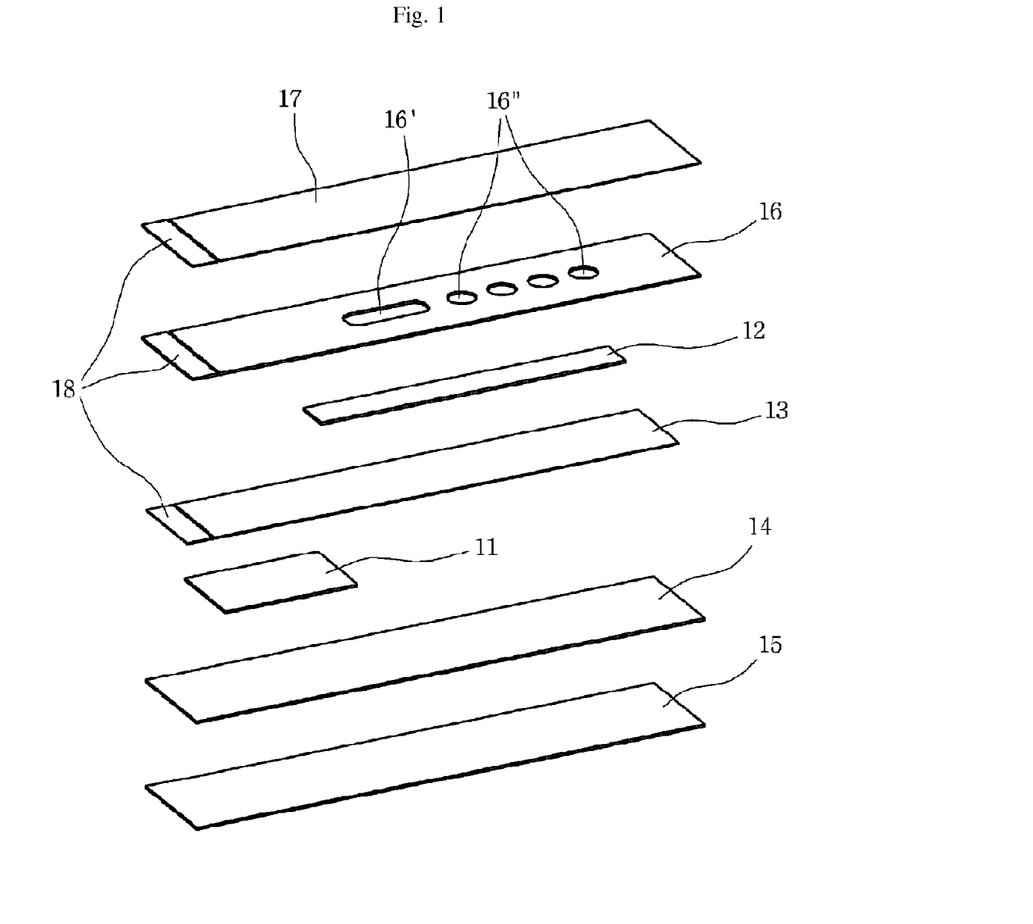
FIG. 1 is an exploded perspective view of a conventional strip type temperature indicator, which is commercially available from 3M.
Figure 2:
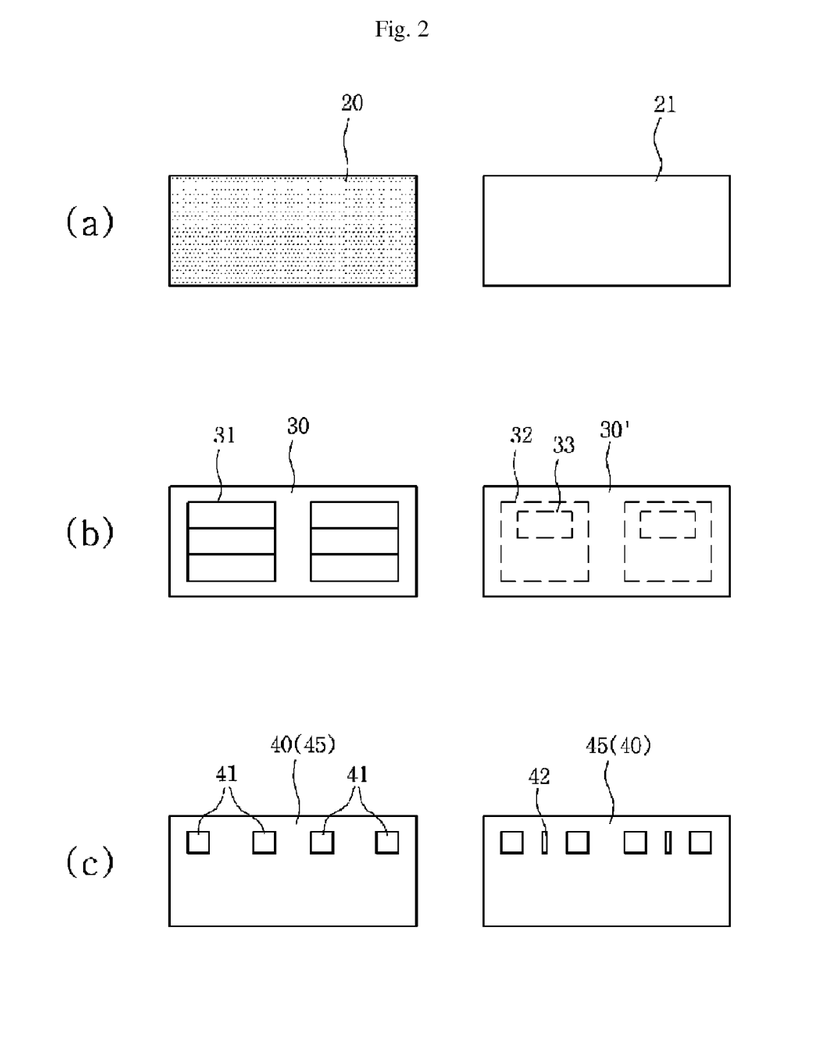
FIG. 2 shows exploded deployment views showing a structure of a critical temperature indicator according to an embodiment of the present invention.

That is, as can be seen from an exploded perspective view of a conventional temperature indicator of FIG. 1, the temperature indicator is a product named "Monitor Mark" of 3M, which is commercially available. A temperature indicator 10 includes a developing material layer 11 configured to enable diffusion through reaction at a set temperature or more, and a developing medium layer 12 configured to absorb a solvent from the developing material layer 11. The developing material layer 11 is a temperature sensor layer formed of ink, fatty acid, paraffin, or the like, and the developing medium layer 12 is formed of a blotting paper or non-woven fabric. A blocking layer 13 is disposed between the developing material layer 11 and the developing medium layer 12. A support layer 14 and a double-sided adhesive tape 15 are disposed under the developing material layer 11. A display layer 16 having a display window is formed on the developing medium layer 12. The display layer 16 has a slightly large display window 16' and slightly small several display windows 16" formed at a position of the developing medium layer 12 in a longitudinal direction thereof. A transparent coating layer 17 is disposed on the display layer 16.

Meanwhile, the developing medium layer 12, the display layer 16 and the transparent coating layer 17 have cutting sections 18 disposed at the same position of one sides thereof and having the same size. The cutting sections 18 are attached to each other by applying an adhesive agent to lower sections thereof. The display layer 16 is disposed on the blocking layer 13 in a state in which the display windows 16' and 16" are disposed on the developing medium layer 13, and the transparent coating layer 17 is disposed on the display layer 16, assembling the temperature indicator.

Accordingly, the temperature indicator 10 is connected to the chilled product by applying an adhesive agent to a bottom surface of the double-sided adhesive tape 15 to attach the tape to the chilled product, removing the cutting section 18 and extracting the blocking layer 13, and attaching the developing material layer 11 to the developing medium layer 12. Next, in the temperature indicator, the developing material layer 11 is actuated due to an increase in ambient temperature so that the ink, fatty acid or paraffin having pigment is melted to permeate the developing medium layer 12, and a storage state of the product is displayed through the display windows 16' and 16".

However, the developing material the temperature indicator 10 is actuated on the developing medium layer in the longitudinal direction, the product size is increased, the blocking layer between the developing medium layer and the developing material layer should be carefully removed upon use, and automation for mass production cannot be easily realized.

In addition, since the developing material of the temperature indicator 10 is not sealed but exposed, the developing material should be cooled for 1 to 2 hours before use. If the developing material is used in a state carelessly exposed to a normal temperature, the developing material may be melted to be stuck to the blocking paper upon removal thereof.

In particular, since a developing speed of such a strip type is reduced as it goes away from a starting point when the developing material develops in one direction, a mechanical error range with respect to confirmation of a critical temperature exposure time may be increased.

In addition, as another typical example in a conventional art, a time indicator and a manufacturing method thereof are disclosed in U.S. Pat. No. 7,232,253 (Jun. 19, 2007). The time indicator includes a first storage room, and an actuation unit configured to come a moving medium in contact with a liquid to convey them to the first storage room such that the liquid after actuation moves via the moving medium in which a color change occurs. The actuation unit includes a second storage room connected between the first storage room and the moving medium. Accordingly, the liquid after actuation is moved from the first storage room to the second storage room at a relatively high speed, and then, moved in a length of the moving medium at a relatively low speed.

While the time indicator of US Patent visually displays the product lifespan, since the liquid, which becomes the developing material upon actuation, is moved to a liquid conduit and then come in contact with the moving medium to be actuated in the longitudinal direction, a moving path of the liquid is bifurcated to make it impossible to accurately measure the time lapse. In addition, since a liquid sealing section is installed to block the liquid conduit to actuate and destruct an actuation unit (a dish-shaped section), which becomes the first storage section, with a certain force, the liquid sealing section may be destructed frequently due to carelessness when the moving medium is actuated to the first storage room by the actuation unit, and the liquid is leaked to the outside. It is also difficult for the time indicator to accurately recognize an exposure time to a cooling environment.

In consideration of the above-mentioned circumstances, it is preferable that the critical temperature indicator has an actuation mechanism capable of checking accuracy of actuation from a use time to a termination time to recognize a management status of a storage state according to a time lapse and a critical temperature from a release time of the product.

In addition, it is preferable to provide a simple structure that can be easily used and applied to small frozen and chilled products, and enables mass production.

In order to solve the above-mentioned problems, a strip indicator used in validation of an injection sterilization process is further advances to enable mass production and commercialization to be applied to foods safety management.

SUMMARY OF INVENTION

Technical Problem

An object of the present invention is to provide a critical temperature indicator and a manufacturing method thereof that are capable of applying them to frozen and chilled foods safety management, easy mass production for industrialization, performing temperature and time control to accurately measure accumulation of an observation time in which foods is exposed to a critical temperature.

Another object of the present invention is to provide a critical temperature indicator and a manufacturing method thereof that are capable of accurately observing exposure of frozen or chilled foods to a critical temperature and providing a red warning mark in the case of an improper storage state by reflecting a storage temperature profile.

Solution to Problem

In order to achieve the aforementioned objects, the present invention provides a critical time indicator constituted by a lower section of a base film, which is a press through pack (hereinafter, referred to as PTP) or a vinyl coating film, having an upper surface formed of red pigment or a predetermined color; a developing medium member stacked on the lower section and formed of a micro-porous film to absorb a developing material and enable diffusion; a time control unit in which a developing medium member is stacked on the lower section, a rectangular or circular moving passage is printed on the developing medium member in a stamped line or a cutout shape using a printer or cutter, and the developing material moves in the moving passage according to a time lapse; transparent members sequentially stacked on the developing medium member, and having cutout sections corresponding to both side surfaces of the moving passage and cut out to temporarily store the developing material, and a first display window having a straight shape through which movement of the developing material from the moving passage to a center thereof can be seen; and an upper section having a second display window formed at a position corresponding to the first display window and a forming section having a spherical shape with a predetermined size and configured to accommodate a developing material member in which the developing material is accommodated, and formed of an opaque layer, wherein the upper section in which the developing material member is integrally sealed with the lower section, the developing medium member, the transparent members and the forming section.

The time control unit according to the embodiment may be a straight strip type, a circular type, a rectangular type, or a concentric type configured to enable time measurement, and at least one actuation starting point of the developing material with respect to exposure to the critical temperature is designated, and one termination point is designated, enabling recognition of an accurate time lapse profile.

In addition, the transparent members according to the present invention are formed by applying at least one of UV, varnishing coating and silk printing.

An example of a method of manufacturing a critical temperature indicator of the present invention includes preparing a developing material member by accommodating a developing material in a cylindrical sealing material; attaching a base sheet formed of lower sections of a plurality of base films having upper surfaces dyed with red and a developing medium sheet formed of a plurality of developing medium members formed of micro-porous films; forming a moving passage of the developing medium, which is a time control unit, at an upper section of the attached developing medium sheet; preparing transparent sheets formed of one or more cutout sections corresponding to a position of the moving passage and configured to temporarily store the developing material at both side surfaces or a predetermined area to pass therethrough, and a plurality of transparent members including a first display window having a straight shape and through which a movement termination of the developing material can be seen; preparing an upper sheet formed of a second display window formed at a position corresponding to the first display window and a plurality of upper films having a forming section configured to accommodate the developing material member; and stacking, sealing and integrating the transparent members and the upper sheet on the developing medium sheet including the base sheet and the temperature control unit, which are already stacked.

Advantageous Effects of Invention

According to the present invention, the red warning mark can be provided in the case of the improper storage state according to the storage temperature profile from the initial manufacturing instant to a final use of frozen or chilled foods with respect to exposure of the critical temperature, mass production becomes possible, and the transparent member sheet and the upper sheet can be accurately disposed on the stacked developing material sheet due to the cutout section and the display windows. Accordingly, since there is no need to print a separate eye mark (an assembly mark) on each sheet, processes can be reduced and a process error can be reduced.

DESCRIPTION OF EMBODIMENTS

An exemplary embodiment according to the present invention will be described in detail with reference to the accompanying drawings.

The same reference numerals in the drawings designate the same components throughout the description even through the components are shown in another drawing. In the description of the present invention, two critical temperature indicators having a rectangular shape are shown. When it is determined that detailed description of known functions and configurations related to the temperature indicator may blur the spirit of the present invention, the detailed description may be omitted.

A critical temperature indicator 100 according to the present invention is constituted by an upper section and a lower section, which are formed of a transparent PTP or vinyl coating film to form a case as a single body. Here, the PTP is an abbreviation of a press through pack, generally used for package of medicines in a tablet or jelly type, which may be referred to as a blister pack.

As shown in FIGS. 2, 3, 4 and 5, the critical temperature indicator 100 is formed of a base film having a lower section 20 dyed with red or a predetermined color, and an upper section 50 is stacked on the lower section 20 with the other components and sealed therewith.

That is, a developing medium member 21 is formed of a micro-porous film to absorb a developing material to enable diffusion thereof, and stacked on the lower section 20.

A time control unit 30 or 30' is printed on the developing medium member 21 as a stamped line 31 or a cutting section 32 using a printer, a cutter, or the like, and removed to remain a circular moving passage 33 only, and the developing material is moved through the moving passage 33 only as a time elapses.

A transparent member 40 and a transparent member 45 are sequentially stacked on the developing medium member 21, cutout sections 41 corresponding to both side surfaces of the moving passage 33 and configured to temporarily store the developing material and enable passage thereof, and a first display window 42 having a straight shape through which movement of the developing material from the moving passage 33 to a center thereof can be seen.

The transparent members may be formed by printing and coating transparent varnish on the developing medium member 21 or using UV or silk printing to form the cutout section 41 and the first display window 42. The upper section 50 (to be described below in detail) on the transparent members.

Figure 5:
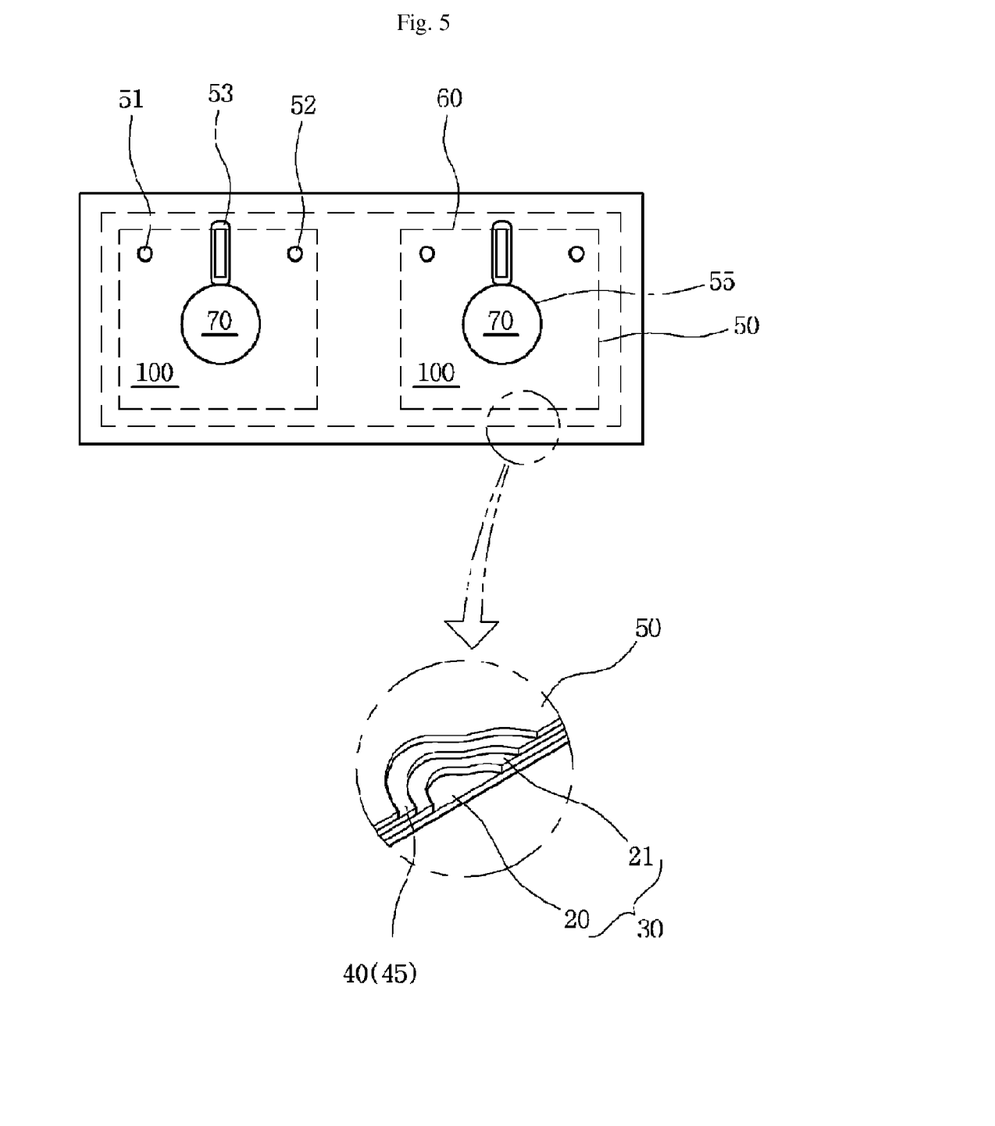
FIG. 5 is a cross-sectional view of a resultant product provided by assembling the components of the critical temperature indicator according to the embodiment of the present invention.

As shown in FIG. 5, the upper section 50 is formed of an opaque layer including a second display window 53 formed at a position at which the critical temperature indicators 100 coincide with the first display windows 42, respectively, third display windows 51 and 52 spaced apart from the second display window 53 and having the cutout section 41 through which a filling state of the developing material can be seen, and a forming section 55 configured to accommodate a developing material member 70 of the developing material.

Accordingly, the developing medium member 21 and the transparent members 40 are disposed on the lower section 20, and the upper section 50 in which the developing material member 70 is accommodated is coupled to and integrated with the forming section 55 through high frequency welding or thermosetting.

Figure 3:
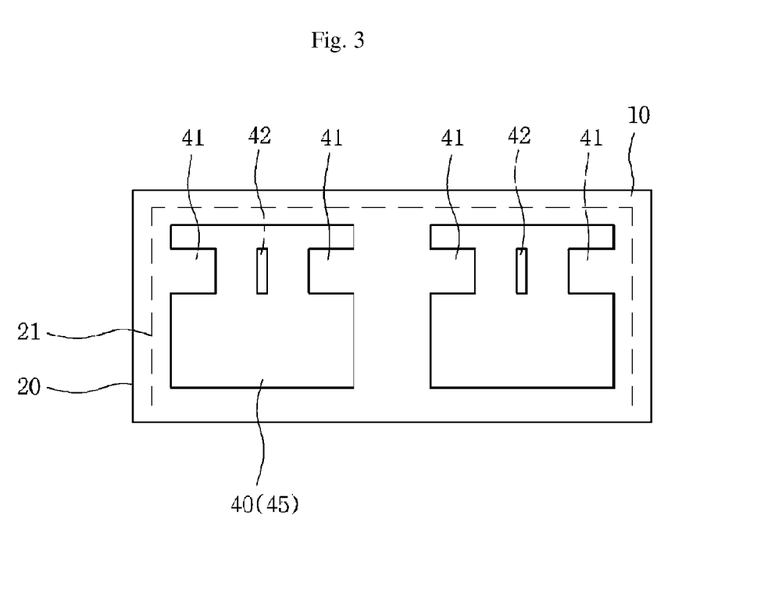
FIG. 3 is a cross-sectional view of an assembly of components of the critical temperature indicator according to the embodiment of the present invention.
Figure 4:
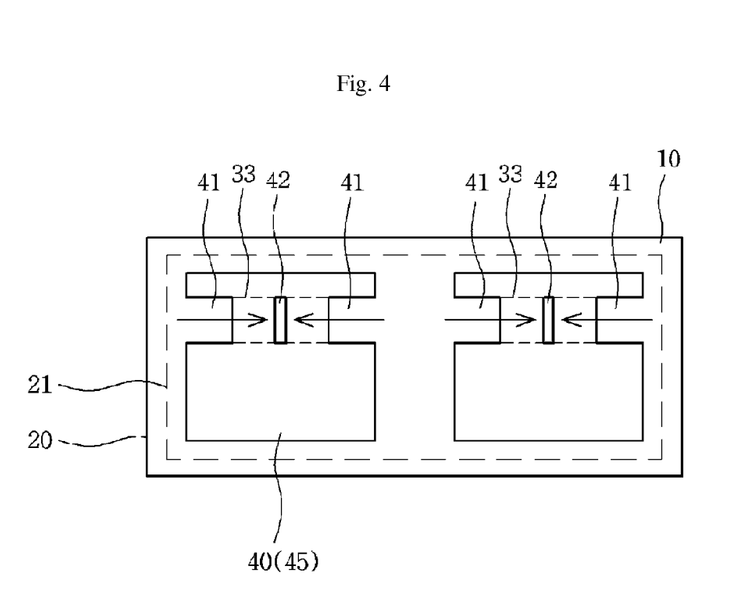
FIG. 4 is a cross-sectional view showing an actuation state of the critical temperature indicator according to the embodiment of the present invention.

That is, as shown in FIG. 3, the developing medium member 21 and the transparent members 40 and 45 are stacked on and coupled to the lower section 20 of the critical temperature indicator 100 from which the upper section 50 is removed, and as shown in FIG. 4, the critical temperature indicator 100 shows a state in which the developing material passing through the cutout section 41 moves toward the first display window 42 or the second display window 53 (see FIG. 5). Here, a moving distance of the developing material is measured to a center of the moving passage 33, and as a result, the time lapse profile can be accurately confirmed in detection of the critical temperature.

In addition, the time control units 30 and 30' may be a straight strip type, a circular type, a rectangular type, or a concentric type extending to enable time measurement, and one or more actuation starting points of the developing material with respect to exposure to the critical temperature is designated, and one termination point is designated, enabling recognition of an accurate time lapse profile.

Meanwhile, as shown in FIG. 5, the critical temperature indicators 100 are mounted in the upper section 50 as two independent units via a boundary area 60, and for the description of actuation of the critical temperature indicator 100, a left temperature indicator before actuation and a right temperature indicator after actuation will be separately described.

The developing material members 70 having a capsule shape are disposed at the center of critical temperature indicators 100 disposed at the left and right sides as described above, i.e., the forming section 55 of the upper section 50, as a sealing body having a spherical shape or the like configured to accommodate the developing material. Accordingly, in order to actuate the critical temperature indicator 100, the developing material member 70 is moved to the cutout section 41 to be broken to temporarily store the developing material to come in contact with the developing medium member 21 formed of the micro-porous film.

In the left critical temperature indicator 100 before actuation, there is no variation in the third display windows 51 and 52 and the second display window 53. However, when the actuation starts, colors of the developing materials showing the actuation start are exhibited through the third display windows 51 and 52, and then, the developing material formed of fatty acid ester or silicon oils melted at a critical temperature or more is moved. Accordingly, the second display window 53 disposed at the center is displayed with red as a time elapses at the predetermined critical temperature or more.

Figure 6:
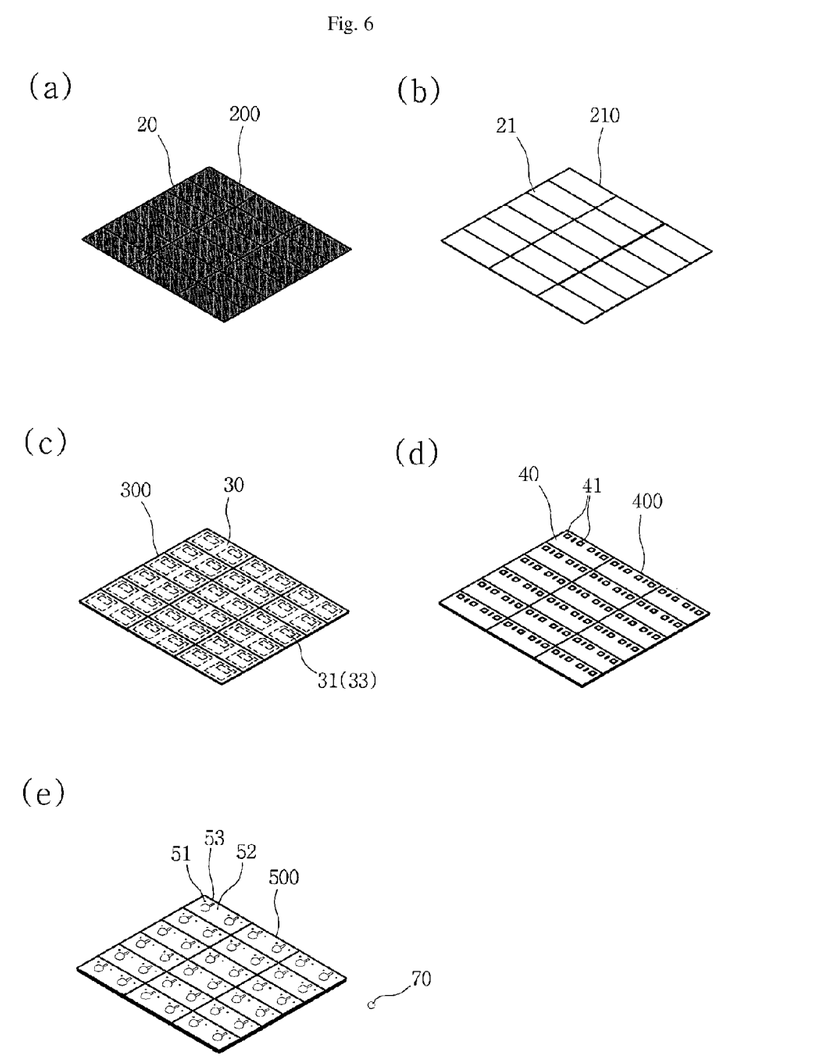
FIG. 6 is a flowchart showing a mass production method of the critical temperature indicator according to the embodiment of the present invention.

In addition, the present invention makes the mass production easy. As shown in FIG. 6, in a method of manufacturing the critical temperature indicator 100, first, the developing material member 70, which is a spherical capsule, is prepared in a sealed state in which the developing material is accommodated. Here, the developing material member 70 is previously manufactured.

A lower sheet 200 is prepared to divide and form a plurality of lower sections 20 formed of a base film such as PE, PET, aluminum foil and red synthetic resin dyed with red. A developing medium sheet 210 is divided into a plurality of developing medium members 21 to correspond to the plurality of lower sections of the lower sheet 200. The lower sheet 20 and the developing medium sheet 210 are attached to each other, and moving passages 31 and 33 of the developing material of the time control units 30 are formed on the developing medium members 210 of the through stamping or engraving using a printer or a cutter to control a time lapse profile according to exposure to the critical temperature.

A transparent member sheet 400 has one or more cutout sections 41 formed on a transparent member or a transparent material through varnishing coating or silk printing to divide a plurality of transparent members 40 and configured to temporarily store the developing material at both side surfaces or a predetermined area to correspond to the moving passage 31 on each of the transparent members 40, and a straight first display window 42 through which movement termination of the developing material can be seen.

An upper sheet 500 is divided into a plurality of upper sections 50, and each of the upper sections 50 is configured to include the second display window 53 formed at a position corresponding to the first display window 42, third display windows 51 and 52 spaced apart from the second display window 53 and through which a filling state of the developing material can be seen via the cutout section 41, and the forming section 55 configured to accommodate the spherical developing material member 70 in which the developing material is received.

Next, the lower sheet 200 having the plurality of lower sections 20 and the developing medium member sheets 210 having the plurality of developing medium member 21 are stacked and coupled to each other, the transparent member sheet 400 formed of the plurality of transparent members 40 forming the cutout section 41 and the first display window 42 is disposed and sealed thereon, and simultaneously, the second display window 53 disposed on the transparent member sheet 400 and the upper sheet 500 forming the third display windows 51 and 52 form a boundary area 60 through high frequency welding or thermosetting in a state in which the developing material member 70 is accommodated in the forming section 55, simultaneously coupling the sheets.

Figure 7:
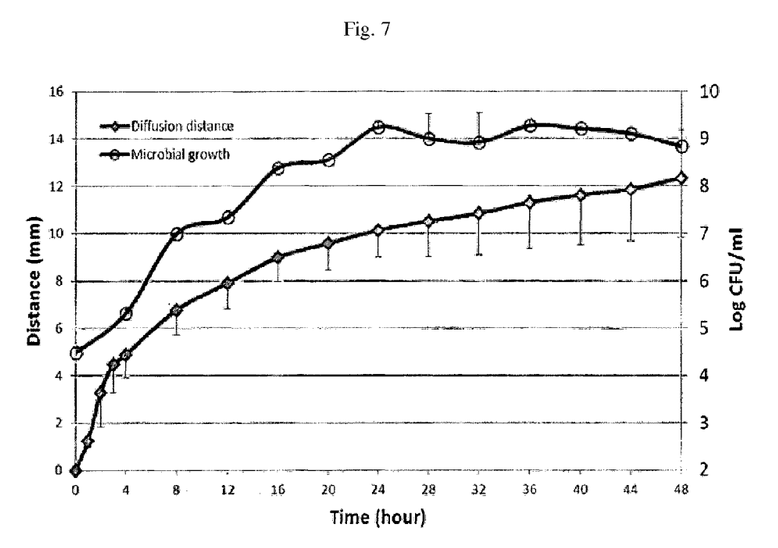
FIGS. 7 and 8 are graphs showing actuation characteristics of the critical temperature indicator according to the embodiment of the present invention.

As shown in FIG. 7, the critical temperature indicator manufactured as described above represents temperature-responsive diffusion of the fatty acid ester at a constant temperature of 30 degrees of centigrade for 48 hours, showing a microbial growth state of Bulgogi Kimbap, which is selected as an actual example.

Figure 8:
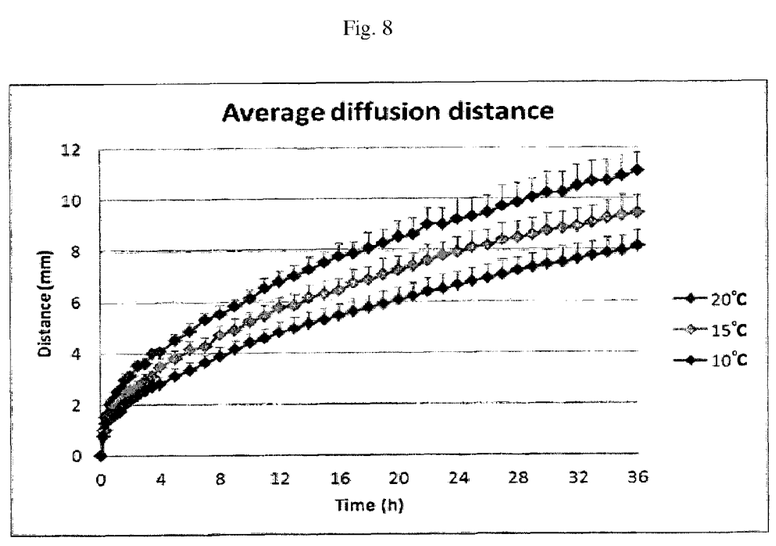

In addition, as shown in FIG. 8, in temperature-responsive diffusion characteristics of the fatty acid ester, it will be appreciated that a diffusion distance is gradually increased as a time elapses, and a distance increase rate for an initial six hours is much larger than that after six hours in the case of storage at 25 degrees of centigrade.

As described above, according to the present invention, since a temperature application range of the product is wide and free, the product can be manufactured according to required temperatures within a range of −15 to 30 degrees of centigrade. In addition, since a time application range of the product is also free, a time adjustment unit having a specific structure can be implemented within a range of 30 minutes to 7 days.

In addition, the present invention can be implemented not to be actuated before attachment to a product using an appropriate control unit, a clear determination can be provided, the size can be reduced, and the price can also be reduced.

An embodiment of the critical temperature indicator and the manufacturing method thereof according to the invention has been discussed above with reference to the accompanying drawings. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multi- plicity of alternate and suitable approaches, depending upon the needs of the particular application, to implement the functionality of any given detail described herein, beyond the particular implementation choices in the following embodiments described and shown.

REFERENCE SIGNS LIST

20: lower section 21: developing medium member 30: time control unit 40, 45: transparent member 50: upper section 70: developing material member 100: critical temperature indicator

The invention claimed is:

1. A critical temperature indicator constituted by an upper section and a lower section formed of a transparent PTP or vinyl coating film as a single body, the critical temperature indicator comprising:
   the lower section formed of a base film having an upper surface dyed with red or a predetermined color;
   a developing medium member stacked on the lower section, formed of a micro-porous film, and configured to absorb a developing material to enable diffusion thereof;
   a time control unit printed on the developing medium member in a stamped line or cutout shape using a printer or a cutter, removed to remain a rectangular or circular moving passage only, and in which the developing material moves through the moving passage only as a time elapses;
   transparent members sequentially stacked on the developing medium member, and having cutout sections corresponding to both side surfaces of the moving passage and cut out to temporarily store the developing material, and a first display window having a straight shape through which movement of the developing material from the moving passage to a center thereof is able to be seen; and
   the upper section having a second display window formed at a position corresponding to the first display window and a forming section having a spherical shape with a predetermined size and configured to accommodate a developing material member in which the developing material is accommodated, and formed of an opaque layer,
   wherein the upper section in which the developing material member is integrally sealed with the lower section, the developing medium member, the transparent members and the forming section.

2. The critical temperature indicator according to claim 1, wherein the time control unit is a straight strip type, a circular type, a rectangular type, or a concentric type configured to enable time measurement, and at least one actuation starting point of the developing material with respect to exposure to the critical temperature is designated, and one termination point is designated, enabling recognition of an accurate time lapse profile.

3. The critical temperature indicator according to claim 1, wherein the transparent members are formed by applying at least one of UV, varnishing coating and silk printing.

4. A method of manufacturing a critical temperature indicator, the method comprising:
   preparing a developing material member by accommodating a developing material in a cylindrical sealing material;
   attaching a base sheet formed of lower sections of a plurality of base films having upper surfaces dyed with red and a developing medium sheet formed of a plurality of developing medium members formed of micro-porous films;

forming a moving passage of the developing medium, which is a time control unit, at an upper section of the attached developing medium sheet;

preparing transparent sheets formed of one or more cutout sections corresponding to a position of the moving passage and configured to temporarily store the developing material at both side surfaces or a predetermined area to pass therethrough, and a plurality of transparent members including a first display window having a straight shape and through which a movement termination of the developing material is able to be seen;

preparing an upper sheet formed of a second display window formed at a position corresponding to the first display window and a plurality of upper films having a forming section configured to accommodate the developing material member; and stacking, sealing and integrating the transparent members and the upper sheet on the developing medium sheet including the base sheet and the temperature control unit, which are already stacked.

5. The method according to claim 4, wherein the transparent members including the cutout section disposed to corresponding to a third display window through which actuation of the developing material is checked and a display window disposed to correspond to a second display window through which arrival of the developing material is checked are formed using UV or a silk printer, and the third display window and the second display window are formed on the transparent members through printing.

* * * * *